United States Patent
Ito et al.

(10) Patent No.: US 7,484,806 B2
(45) Date of Patent: Feb. 3, 2009

(54) SEAT RECLINING APPARATUS FOR VEHICLE

(75) Inventors: Sadao Ito, Anjo (JP); Yukifumi Yamada, Toyota (JP)

(73) Assignee: Aisin Seiki Kabushiki kaisha, Kariya-Shi, Aichi-Ken (JP)

( * ) Notice: Subject to any disclaimer, the term of this patent is extended or adjusted under 35 U.S.C. 154(b) by 100 days.

(21) Appl. No.: 11/633,549

(22) Filed: Dec. 5, 2006

(65) Prior Publication Data
US 2007/0138853 A1    Jun. 21, 2007

(30) Foreign Application Priority Data
Dec. 16, 2005   (JP) .............. 2005-363958

(51) Int. Cl.
*B60N 2/02* (2006.01)
(52) U.S. Cl. ................................. 297/362
(58) Field of Classification Search .............. 297/362
See application file for complete search history.

(56) References Cited

U.S. PATENT DOCUMENTS

| | | | |
|---|---|---|---|
| 4,469,375 A * | 9/1984 | Boyer | 297/362 |
| 5,634,689 A | 6/1997 | Putsch et al. | |
| 7,192,090 B2 * | 3/2007 | Sakamoto | 297/362.14 |

FOREIGN PATENT DOCUMENTS

| | | | |
|---|---|---|---|
| JP | 7-255553 A | 10/1995 | |
| JP | 3018566 B2 | 1/2000 | |

* cited by examiner

*Primary Examiner*—Sarah B McPartlin
(74) *Attorney, Agent, or Firm*—Buchanan Ingersoll & Rooney PC

(57) ABSTRACT

A seat reclining apparatus for a vehicle includes a first plate including internal gear teeth, a second plate including external gear teeth, a third plate including internal gear teeth, a fourth plate including external gear teeth, a shaft rotatably supported by the first and third plates, first and second wedge members, a first cam pressing the wedge members to integrally rotate therewith, a support member arranged between the third and fourth plates and engaging with the third plate and the fourth plate when an amount of eccentricity between the internal gear teeth and the external gear teeth reaches a predetermined level, and a second cam pressing the support member to integrally rotate therewith. The amount of eccentricity defined by the support member is smaller than that defined by the wedge members.

16 Claims, 5 Drawing Sheets

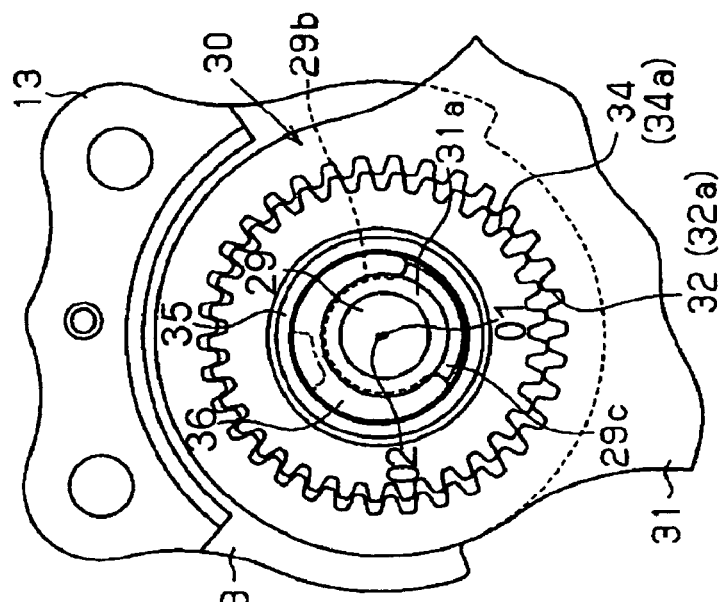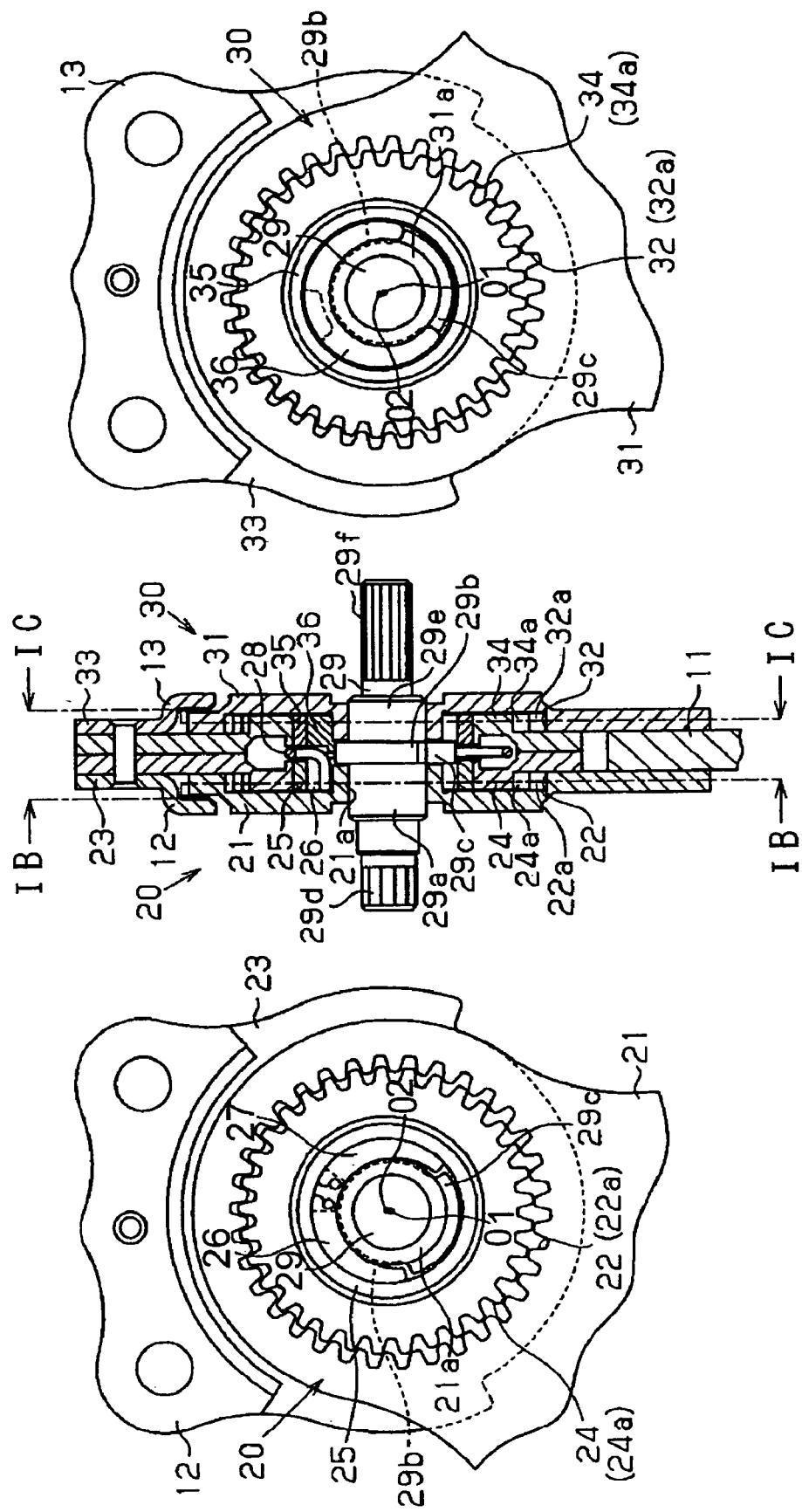

SEAT RECLINING APPARATUS FOR VEHICLE

CROSS REFERENCE TO RELATED APPLICATIONS

This application is based on and claims priority under 35 U.S.C. § 119 to Japanese Patent Application No. 2005-363958, filed on Dec. 16, 2005, the entire content of which is incorporated herein by reference.

FIELD OF THE INVENTION

This invention generally relates to a seat reclining apparatus for a vehicle.

BACKGROUND

A known seat reclining apparatus for a vehicle intended for inclining a seatback relative to a seat cushion is disclosed in JP07-255553A. The seat reclining apparatus disclosed includes a lower plate attached to a seat cushion and having internal gear teeth, and an upper plate attached to a seatback and having external gear teeth. The external gear teeth engage with the internal gear teeth in a state where the total number of the external gear teeth is smaller than that of the internal gear teeth. An angle of inclination of the upper plate relative to the lower plate is sequentially adjustable by a circumferential movement of a position at which the internal gear teeth and the external gear teeth engage with each other (i.e. engagement position). Then, a combination of a pair of wedge members provided between the lower plate and the upper plate, and a cam member is used as a mechanism for rotating or shifting the engagement position of the internal gear teeth and the external gear teeth. The cam member is rotated by an operating handle, and then the wedge members are rotated to press the internal gear teeth of the lower plate and the external gear teeth of the upper plate in a predetermined direction so that both gear teeth engage with each other, thereby achieving a rotation or shifting of the engagement position.

However, according to JP07-255553A, in the cases where the seat reclining apparatus is applied to a belt integrated seat in which a seatbelt and its peripheral structure are integrated into a seat, an absolute strength of the seat is weak against a large load added to the seatback in the event of a vehicle collision and thus the seat may not endure the load at that time.

Meanwhile, a seat reclining apparatus for a vehicle intended for higher strength is disclosed in JP3018566B2. The seat reclining apparatus disclosed includes two reclining mechanisms attached to each other in a back-to-back manner so as to be arranged in a mirror image relationship. Gear shapes (i.e. internal gear teeth and external gear teeth) of the two reclining mechanisms are differently formed so that a backlash between the internal gear teeth and the external gear teeth of one of the reclining mechanisms is specified greater than that between the internal gear teeth and the external gear teeth of the other one of the reclining mechanisms. Accordingly, in the case of normal operation, the internal gear teeth and the external gear teeth of one of the reclining mechanisms engage with each other while the internal gear teeth and the external gear teeth of the other one of the reclining mechanisms are not in contact with each other, thereby preventing unnecessary increase of an operation force. In addition, in the event of the vehicle collision, the internal gear teeth and the external gear teeth of the other one of the reclining mechanisms make contact with each other upon deformation of the internal gear teeth and the external gear teeth of one of the reclining mechanisms, thereby causing both the reclining mechanisms to receive the load at that time.

According to the seat reclining apparatus disclosed in JP3018566B2, the shapes of the respective internal gear teeth and the external gear teeth of two reclining mechanisms are different and thus two types of parts are required for engagement of the gear teeth, which leads to an increase of the number of parts. In addition, even for the internal gear teeth and the external gear teeth engaging with each other or making contact with each other in the normal operation, a small backlash is required therebetween for the purposes of a smooth engagement operation or prevention of effect on the operation due to gear accuracy. Accordingly, looseness is generated in the seatback, which may cause a decrease of quality feeling.

Thus, a need exists for a seat reclining apparatus for a vehicle that can improve strength thereof without deterioration of quality feeling.

SUMMARY OF THE INVENTION

According to an aspect of the present invention, a seat reclining apparatus for a vehicle includes a first plate attached to one of a seat cushion and a seatback and including internal gear teeth, the first plate provided at one side in a width direction of a seat, a second plate attached to the other one of the seat cushion and the seatback and including external gear teeth engaging with the internal gear teeth of the first plate, a total number of the external gear teeth being smaller than a total number of the internal gear teeth of the first plate, the second plate provided at the one side in the width direction of the seat, a third plate attached to the one of the seat cushion and the seatback and including internal gear teeth, the third plate provided at the one side in the width direction of the seat, and a fourth plate attached to the other one of the seat cushion and the seatback and including external gear teeth engaging with the internal gear teeth of the third plate, a total number of the external gear teeth being smaller than a total number of the internal gear teeth of the third plate, the fourth plate provided at the one side in the width direction of the seat. The seat reclining apparatus for a vehicle further includes a shaft rotatably supported by the first and third plates, a first and second wedge members arranged between one of the first and second plates and the third and fourth plates and biased in a direction where an amount of eccentricity between the internal gear teeth and the external gear teeth of the one of the first and second plates and the third and fourth plates is increased so as to maintain a position at which the internal gear teeth and the external gear teeth engage with each other, a first cam provided at the shaft and pressing the wedge members to integrally rotate therewith in response to a rotation of the shaft so that the position at which the internal gear teeth and the external gear teeth engage with each other is shifted in a circumferential direction, a support member arranged between the other one of the first and second plates and the third and fourth plates and engaging with the third plate and the fourth plate when an amount of eccentricity between the internal gear teeth and the external gear teeth of the other one of the first and second plates and the third and fourth plates reaches a predetermined level, and a second cam provided at the shaft and pressing the support member to integrally rotate therewith in response to a rotation of the shaft. The amount of eccentricity defined by the support member is smaller than the amount of eccentricity defined by the wedge members.

BRIEF DESCRIPTION OF THE DRAWINGS

The foregoing and additional features and characteristics of the present invention will become more apparent from the following detailed description considered with reference to the accompanying drawings, wherein:

FIG. 1A is a cross-sectional view of a seat reclining apparatus according to an embodiment of the present invention;

FIG. 1B is a cross-sectional view taken along the line IB-IB in FIG. 1A;

FIG. 1C is a cross-sectional view taken along the line IC-IC in FIG. 1A;

DETAILED DESCRIPTION

An embodiment of the present invention will be explained with reference to the attached drawings. The embodiment is employed in a so-called belt integrated seat mounted in a vehicle and in which a three-point seat belt and a peripheral structure thereof are integrated. According to the present embodiment, a shoulder anchor is attached on one side (i.e., an outer side or a door side, corresponding to a left side in FIG. 1A) of a seatback in a width direction of a seat 1.

Figure 2:
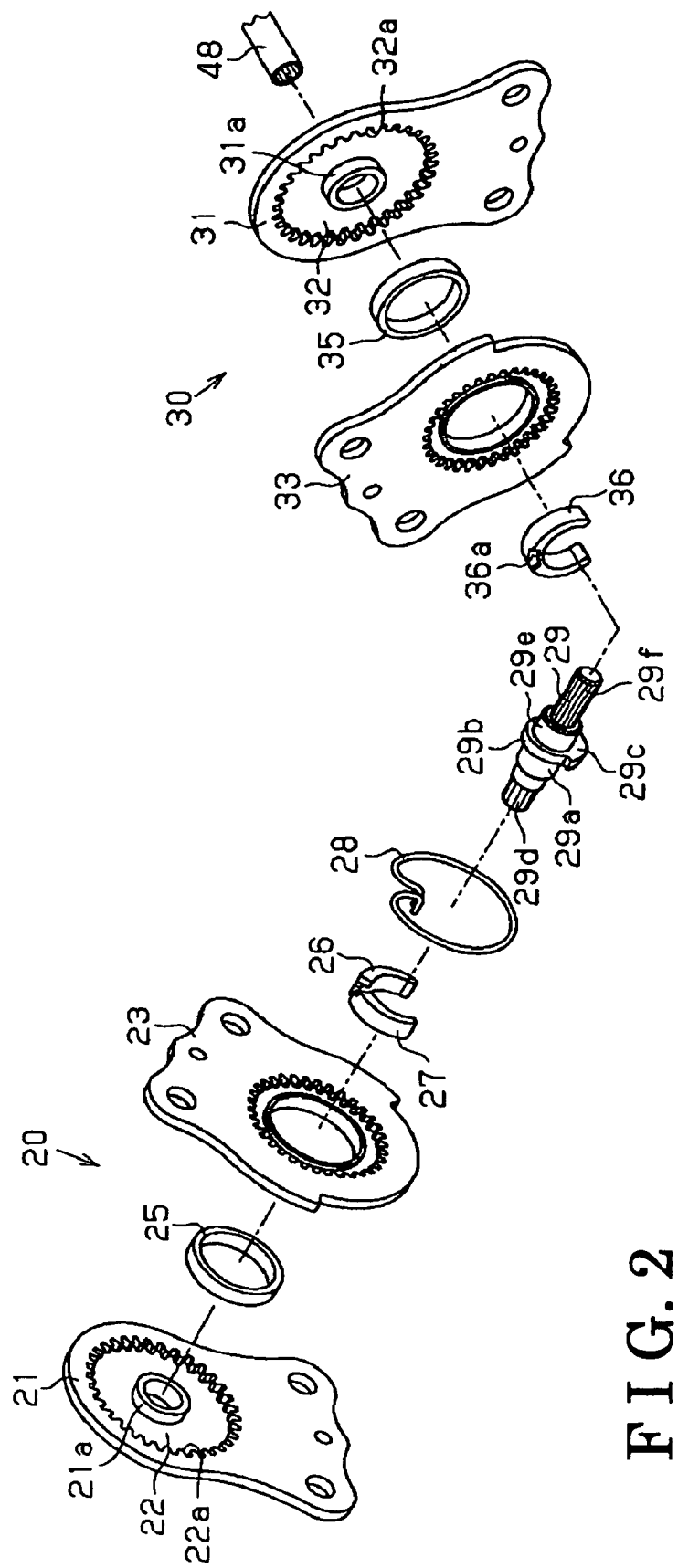
FIG. 2 is an exploded perspective view of the seat reclining apparatus according to the embodiment of the present invention.
Figure 5:
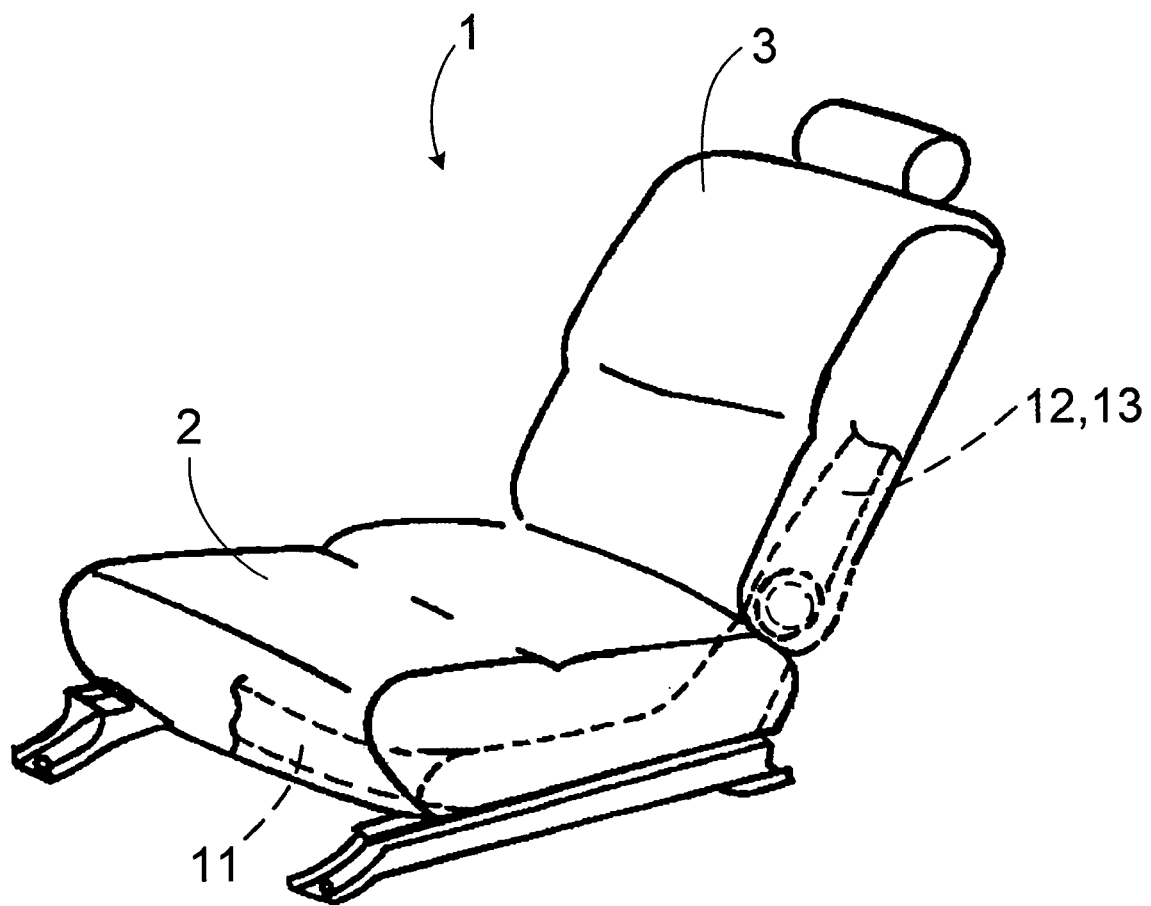
FIG. 5 is a view of a seat to which the seat reclining apparatus according to the embodiment of the present invention is mounted.

FIG. 1A is a cross-sectional view of a structure on one side of a seat reclining apparatus for a vehicle in a seat width direction. FIG. 1B is a cross-sectional view taken along the line IB-IB in FIG. 1A. FIG. 1C is a cross-sectional view taken along the line IC-IC in FIG. 1A. FIG. 2 is an exploded perspective view showing a structure of one side of the seat reclining apparatus in the seat width direction. FIG. 5 is a view of a seat 1 to which the seat reclining apparatus is mounted.

As shown in FIG. 1A, a pair of seatback frames 12 and 13 made of a metal plate and constituting a main structure of a seatback 3 are rotatably connected by means of two reclining mechanisms 20 and 30, respectively, to a seat cushion frame 11 made of a metal plate and constituting a main structure of a seat cushion 2. The seatback frames 12 and 13 have identical structures to each other in a symmetrical manner. The reclining mechanisms 20 and 30 are connected to each other so as to be arranged in a back-to-back manner on right and left sides (i.e. inner and outer sides of a seat) as shown in FIG. 1A.

One of the relining mechanisms, i.e. the reclining mechanism 20, will be explained below with reference to FIGS. 1A and 1B. A lower plate 21 (first plate) fixed to an outer surface (i.e. surface facing the outer side of a seat) of the seat cushion frame 11 is molded by a half blanking of a metal plate. The lower plate 21 includes a recess portion 22 recessed from an inner side (i.e. side of the reclining mechanism 30) so as to form a circular shape. Then, internal gear teeth 22a are formed at the recess portion 22. An annular-shaped bearing portion 21a, a center of which opens, is formed at a center of the recess portion 22 so as to project in an inward direction of a seat (i.e. right side in FIG. 1A) and to be concentric with the recess portion 22.

An upper plate 23 (second plate) fixed to an inner surface (i.e. surface facing the inner side of a seat) of the seatback frame 12 is formed by a half blanking of a metal plate. The upper plate 23 includes an annular portion 24 formed on an outer side, facing the lower plate 21, so as to extend in an outward direction of a seat (i.e. left side in FIG. 1A) into an annular shape. An outer diameter of the annular portion 24 is smaller than an inner diameter of the recess portion 22. External gear teeth 24a are formed at the annular portion 24. Further, an annular-shaped bearing ring 25 having an outer diameter substantially equal to an inner diameter of the annular portion 24 is fixed to the annular portion 24 by press fitting. An inner diameter of the bearing ring 25 is specified greater than an outer diameter of the bearing portion 21a.

The total number of the internal gear teeth 22a is greater than that of the external gear teeth 24a. That is, for example, the internal gear teeth 22a include one additional tooth compared to the external gear teeth 24a. The internal gear teeth 22a are molded into such a shape so as to engage with the external gear teeth 24a. As shown in FIG. 1B, in the cases where the internal gear teeth 22a and the external gear teeth 24a engage with each other, a center axis O1 of the internal gear teeth 22a and a center axis O2 of the external gear teeth 24a do not coincide with each other, i.e. the internal gear teeth 22a and the external gear teeth 24a are eccentric to each other. Thus, when a position at which the internal gear teeth 22a and the external gear teeth 24a engage with each other (i.e. engagement position) is sequentially shifted in a circumferential direction, the upper plate 23 rotates relative to the lower plate 21 by an angle corresponding to a difference of the number of teeth between the internal gear teeth 22a and the external gear teeth 24a per rotation of a shaft 9 which will be explained later.

While the internal gear teeth 22a and the external gear teeth 24a engage with each other, the bearing ring 25 extends to an axial one side (i.e. right side in FIG. 1A) from the bearing portion 21a. A portion of an inner peripheral surface of the bearing ring 25 overlaps with a portion of an outer peripheral surface of the bearing portion 21a in view of an axial position. Then, wedge pieces 26 and 27 (first and second wedge members) are disposed in an annular space formed between the inner peripheral surface of the bearing ring 25 and the outer peripheral surface of the bearing portion 21a while the internal gear teeth 22a and the external gear teeth 24a engage with each other in an eccentric manner. The wedge pieces 26 and 27 are arranged along a circumferential direction based on an angular position of the engagement between the internal gear teeth 22a and the external gear teeth 24a. That is, the wedge pieces 26 and 27 are each formed into an inferior arc shape symmetrical to each other while fitting in the space formed between the inner peripheral surface of the bearing ring 25 and the outer peripheral surface of the bearing portion 21a. The wedge pieces 26 and 27 are getting wider in a radial direction towards a circumferentially end side, i.e. the angular position side of the engagement between the internal gear teeth 22a and the external gear teeth 24a. Further, as shown in FIG. 1A, each axial width of the wedge pieces 26 and 27 is specified greater than that of the bearing ring 25. An Ω-shaped spring 28 (see FIG. 2) arranged on an outer circumferential side of the wedge pieces 26 and 27 and one end and the other end of which engage with the wedge pieces 26 and 27, respectively, biases the wedge pieces 26 and 27 in a direction where the wedge pieces 26 and 27 are separated from each other, i.e. in a direction where an amount of eccentricity between the internal gear teeth 22a and the external gear teeth 24a increases. Accordingly, the wedge pieces 26 and 27 maintain the engagement position of the internal gear teeth 22a and the external gear teeth 24a. That is, the aforementioned reclining mechanism 20 maintains the rotational angle of the upper plate 23 relative to the lower plate 21 by means of a friction force of the pair of wedge pieces 26 and 27, and a biasing force of the spring 28.

A shaft 29 made of a metal bar and inserted from the inner side (i.e. right side in FIG. 1A) into the bearing portion 21a of the lower plate 21 includes a shaft main portion 29a having a column shape and an outer diameter substantially equal to the inner diameter of the bearing portion 21a. The shaft 29 is rotatably supported by the lower plate 21 via the shaft main portion 29a. The shaft 29 also includes a flange 29b provided on the axial one side (i.e. right side in FIG. 1A) of the shaft main portion 29a and extending radially outwardly in a state where the flange 29b is positioned adjacent to an axial end face of the bearing portion 21a. An outer diameter of the flange 29b is specified smaller than that of the bearing portion 21a.

The shaft 29 includes a cam 29c (first cam and second cam) extending radially outwardly into an arc shape and arranged at an angular position opposite to the engagement position of the internal gear teeth 22a and the external gear teeth 24a. An outer diameter of the cam 29c is smaller than the inner diameter of the bearing ring 25, and at the same time greater than the outer diameter of the bearing portion 21a. Further, a portion of the cam 29c overlaps with each portion of the wedge pieces 26 and 27 extending from the axial end face of the bearing portion 21a in view of the axial position. The cam 29c is arranged between the wedge pieces 26 and 27 while forming a gap with each of the wedge pieces 26 and 27 in a circumferential direction as shown in FIG. 1B.

According to the aforementioned structure, when the shaft 29 is driven to rotate, either one of the wedge pieces 26 and 27 is pressed by the cam 29c depending on a rotation direction of the shaft 29. Then, the spring 28 is biased and deformed so that both the wedge pieces 26 and 27 rotate as a unit with the cam 29c. At this time, the amount of eccentricity between the internal gear teeth 22a and the external gear teeth 24a decreases. Consequently, the position of engagement between the internal gear teeth 22a and the external gear teeth 24a is shifted, thereby causing the upper plate 23 to rotate relative to the lower plate 21.

The shaft 29 includes a serration shaft 29d formed continuously from the shaft main portion 29a and extending to an axial other side (i.e. left side in FIG. 1A). Further, the shaft 29 includes a shaft main portion 29e formed continuously from the flange 29b and extending to the axial one side (i.e. right side in FIG. 1A), and a serration shaft 29f formed continuously from the shaft main portion 29e and extending further to the axial one side. An outer diameter of the shaft main portion 29e is substantially equal to that of the shaft main portion 29a.

Next, the other reclining mechanism 30 will be explained. A lower plate 31 (third plate) fixed to an inner surface (i.e. surface facing the inner side of a seat) of the seat cushion frame 11 is molded by a half blanking of a metal plate. The lower plate 31 has the equal shape to that of the lower plate 21 except that the lower plate 31 is arranged in a mirror image manner relative to the lower plate 21. That is, the lower plate 31 includes a recess portion 32 recessed from the outer side (i.e. side of the reclining mechanism 20) so as to form a circular shape. Internal gear teeth 32a are formed at the recess portion 32. Further, an annular-shaped bearing portion 31a, a center of which opens, is formed at a center of the recess portion 32 so as to project in the outward direction of a seat to be concentric with the recess portion 32.

According to the present embodiment, the identical parts are applied to the lower plates 21 and 31, respectively. The lower plates 21 and 31 are connected to the seat cushion frame 11 by fastening in such a manner that the lower plates 21 and 31 sandwich the seat cushion frame therebetween in a thickness direction. Accordingly, the lower plates 21 and 31 are substantially integrated with the seat cushion frame 11.

An upper plate 33 (fourth plate) fixed to an outer surface (i.e. surface facing the outer side of a seat) of the setback frame 13 is formed by a half blanking of a metal plate. The upper plate 33 has the equal shape to that of the upper plate 23 except that the upper plate 33 is arranged in a mirror image manner relative to the upper plate 23. That is, the upper plate 33 includes an annular portion 34 formed on an inner side, facing the lower plate 31, so as to extend in the inward direction of a seat into an annular shape. An outer diameter of the annular portion 34 is smaller than an inner diameter of the recess portion 32. External gear teeth 34a are formed at the annular portion 34. Further, an annular-shaped bearing ring 35 having an outer diameter substantially equal to an inner diameter of the annular portion 34 is fixed to the annular portion 34 by press fitting. An inner diameter of the bearing ring 35 is greater than an outer diameter of the bearing portion 31a.

According to the present embodiment, the identical parts are applied to the upper plates 23 and 33, respectively. The upper plates 23 and 33 are connected to each other in a back-to-back manner and connected to the seatback frames 12 and 13 by fastening in such a manner that the upper plates 23 and 33 are sandwiched by the seatback frames 12 and 13 in a thickness direction. Accordingly, the upper plates 23 and 33 are substantially integrated with the seatback frames 12 and 13.

While the internal gear teeth 32a and the external gear teeth 34a engage with each other, the bearing ring 35 extends to the axial other side (i.e. left side in FIG. 1A) from the bearing portion 31a. A portion of an inner peripheral surface of the bearing ring 35 overlaps with a portion of an outer peripheral surface of the bearing portion 31a in view of the axial position. Then, a support piece 36 (supporting member) is disposed in an annular space formed between the inner peripheral surface of the bearing ring 35 and the outer peripheral surface of the bearing portion 31a while the internal gear teeth 32a and the external gear teeth 34a engage with each other in an eccentric manner. The support piece 36 is formed into a symmetrical superior arc shape while fitting in the space formed between the inner peripheral surface of the bearing ring 35 and the outer peripheral surface of the bearing portion 31a. The support piece 36 is getting wider in a radial direction towards a circumferentially center side, i.e. an angular position side of the engagement between the internal gear teeth 32a and the external gear teeth 34a. An inner diameter of the support piece 36 is substantially equal to the outer diameter of the bearing portion 31a. At the same time, an amount of eccentricity of the outer periphery of the support piece 36 relative to the inner periphery of the bearing ring 35 is defined such that the support piece 36 can be arranged on an inner peripheral side of the bearing ring 35. Then, in the normal state where the engagement position of the internal gear teeth 22a and the external gear teeth 24a is maintained or shifted by means of the pair of wedge pieces 26 and 27, and also the engagement position of the internal gear teeth 32a and the external gear teeth 34a is maintained or shifted, a gap is formed between the support piece 36 and the inner peripheral surface of the bearing ring 35. In addition, an axial width of the support piece 36 is greater than that of the bearing ring 35. The support piece 36 makes contact with the inner peripheral surface of the bearing ring 35 so as to receive a part of load added to a seat in the event of a vehicle collision, and the like, when the amount of eccentricity (i.e. distance between the center axes O1 and O2) between the internal gear teeth 32a and the external gear teeth 34a, and that between the internal gear teeth 22a and the external gear teeth 24a each decreases to a predetermined level. The support piece 36 includes a notch 36a (see FIG. 2) so as to prevent an interference with the spring 28.

The shaft 29 is inserted from the inner side (i.e. right side in FIG. 1A) into the bearing portion 31a of the lower plate 31 and then rotatably supported by the lower plate 31 via the shaft main portion 29e. The flange 29b is positioned adjacent to an axial end face of the bearing portion 31a. A portion of the cam 29c overlaps with a portion of the support piece 36 extending from the axial end face of the bearing portion 31a in view of the axial position. As shown in FIG. 1C, the cam 29c is arranged at an angular position opposite to the engagement position of the internal gear teeth 32a and the external gear teeth 34a. In addition, the cam 29c makes contact with circumferentially end faces of the support piece 36 by means of circumferentially end faces, respectively. That is, the cam 29c is arranged between the circumferentially end faces of the support piece 36 while forming no gap therewith in the circumferential direction.

According to the aforementioned structure, when the shaft 29 is driven to rotate, the support piece 36 is pressed by the cam 29c depending on a rotation direction of the shaft 29, thereby causing the support piece 36 to rotate as a unit with the cam 29c. At this time, with the gap formed between the support piece 36 and the inner peripheral surface of the bearing ring 35, the support piece 36 rotates by itself around the bearing portion 31a without influencing a rotation of the wedge piece 26 and 27, i.e. shifting of the engagement position of the internal gear teeth 22a and the external gear teeth 24a as well as that between the internal gear teeth 32a and the external gear teeth 34a. That is, precisely, the upper plate 33 rotates relative to the lower plate 31 with the internal gear teeth 32a and the external gear teeth 34a not in contact with each other.

Figures 3A, 3B, 3C:
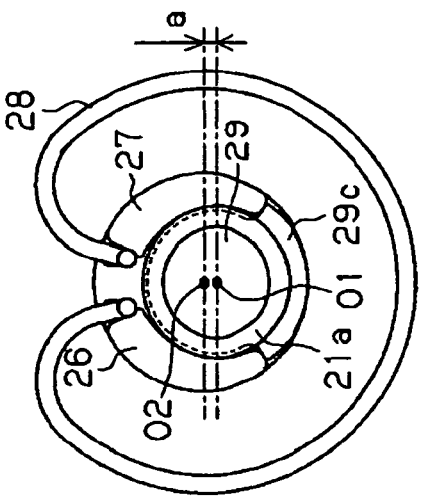
FIGS. 3A to 3F are views for explaining an amount of eccentricity.

Next, a relationship between the amount of eccentricity (i.e. distance between the center axes O1 and O2) defined by the pair of wedge pieces 26 and 27, and the amount of eccentricity defined by the support piece 36 will be explained with reference to FIGS. 3A to 3F. The amount of eccentricity defined by the wedge pieces 26 and 27 varies depending on an elastic deformation of the spring 28, i.e. a distance between the wedge pieces 26 and 27. As shown in FIG. 3A, when the wedge pieces 26 and 27 (i.e. both ends of the spring 28) are positioned nearest to each other, a minimum amount of eccentricity c is obtained. Then, as shown in FIG. 3B, when the wedge pieces 26 and 27 are away from each other, an amount of eccentricity b is obtained. Finally, as shown in FIG. 3C, when the wedge pieces 26 and 27 are at a maximum distance from each other, a maximum amount of eccentricity a is obtained.

Figures 3D, 3E, 3F:
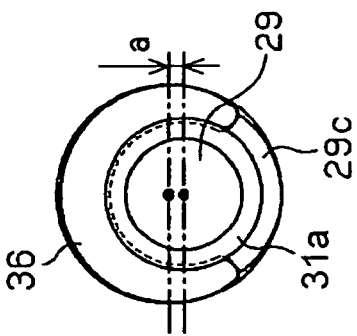

Meanwhile, in the case of the normal operation in which the engagement position is retained or shifted, the support piece 36 is not involved in retention of the engagement position of the internal gear teeth 22a and the external gear teeth 24a and that between the internal gear teeth 32a and the external gear teeth 34a. That is, when the support piece 36 forms the amount of eccentricity a or the amount of eccentricity b as shown in FIGS. 3E and 3F, the support piece 36 is prevented from making contact with the bearing ring 35 or the bearing portion 21a. As a result, the support piece 36 does not affect the amount of eccentricity defined by the wedge pieces 26 and 27. On the other hand, when a large load is added to a seat in the event of a vehicle collision, and the like, the amount of eccentricity defined by the wedge pieces 26 and 27, and the support piece 36 may decrease because the internal gear teeth 22a or the external gear teeth 24a, the internal gear teeth 32a or the external gear teeth 34a, the wedge pieces 26 and 27, the bearing portions 21a and 31a, the bearing rings 25 and 35, and the like are deformed or the wedge pieces 26 and 27 are moved closer to each other against the biasing force of the spring 28. Then, when an amount of eccentricity d is achieved by the support piece 36 as shown in FIG. 3D, the inner peripheral surface and the outer peripheral surface of the support piece 36 make contact with the outer peripheral surface of the bearing ring 35 and the inner peripheral surface of the bearing ring 35, respectively, so that the reclining mechanism 30 can receive the load together with the reclining mechanism 20. In this case, the amount of eccentricity d defined by the support piece 36 is smaller than the amount of eccentricity c defined by the wedge pieces 26 and 27 when the wedge pieces 26 and 27 are positioned nearest to each other.

Figure 4:
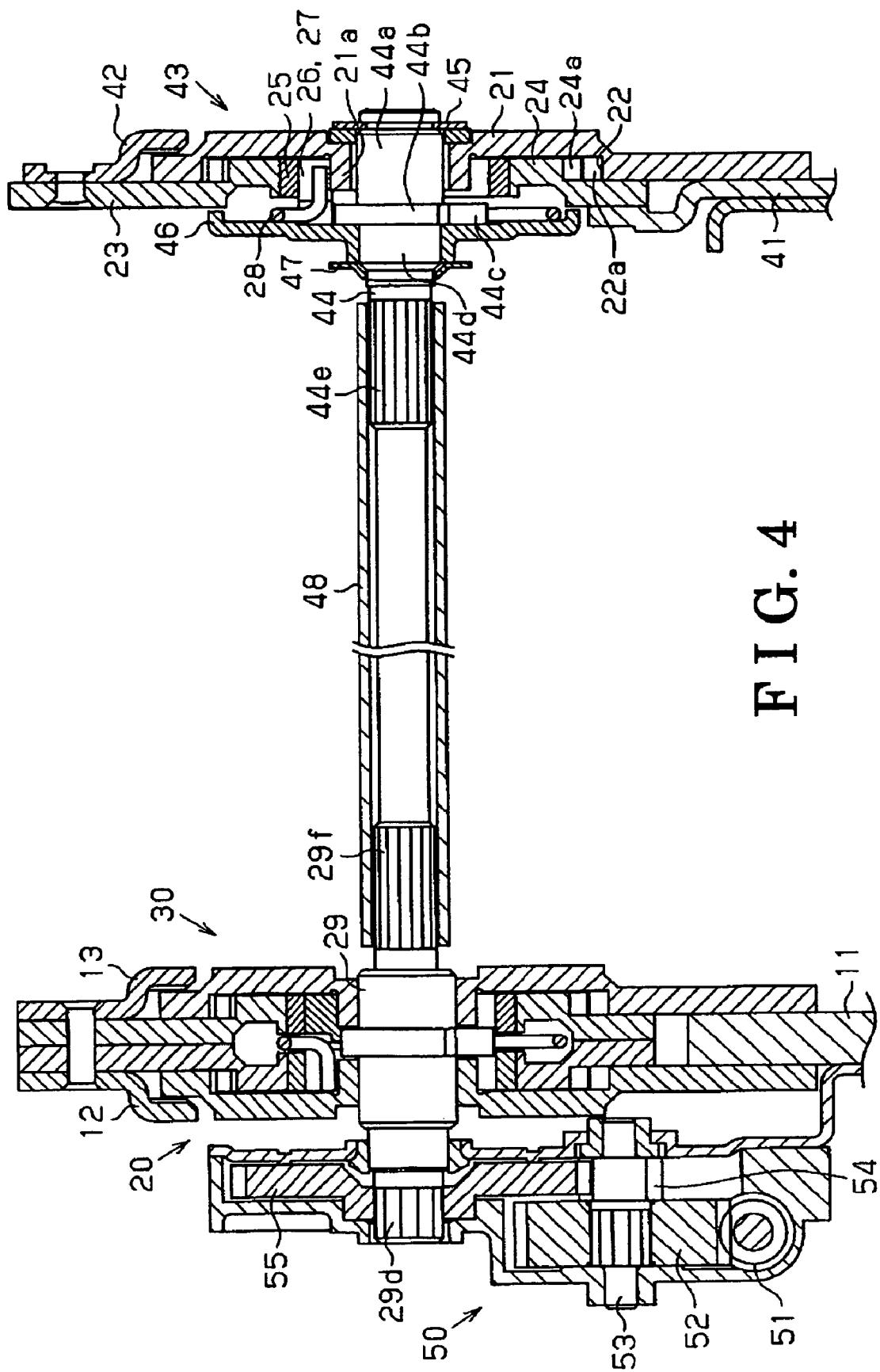
FIG. 4 is a cross-sectional view of the seat reclining apparatus according to the embodiment of the present invention.

FIG. 4 is a cross-sectional view of structures on one side (i.e. outer side of a seat) and the other side (i.e. inner side of a seat) of the seat reclining apparatus for a vehicle in the seat width direction. As shown in FIG. 4, a seatback frame 42 made of a metal plate and constituting a main structure of a seatback is rotatably connected by means of a reclining mechanism 43 to a seat cushion frame 41 made of a metal plate and constituting a main structure of a seat cushion. A structure of the reclining mechanism 43 is substantially equal to that of the reclining mechanism 20 and thus the substantially same parts or components bear the same numbers in the reclining mechanism 43.

A shaft 44 made of a metal bar and inserted from the inner side into the bearing portion 21a of the reclining mechanism 43 includes a shaft main portion 44a having a column shape and an outer diameter substantially equal to an inner diameter of the bearing portion 21a. The shaft 44 is rotatably supported by the lower plate 21 via the shaft main portion 44a. The shaft 44 is prevented from moving to the inner side by means of a ring 45 provided at the shaft main portion 44a on the outer side of the lower plate 21. The shaft 44 also includes a flange 44b provided on the axial other side (i.e. left side in FIG. 4) of the shaft main portion 44a and extending radially outwardly in a sate where the flange 44b is positioned adjacent to the axial end face of the bearing portion 21a. An outer diameter of the flange 44b is smaller than that of the bearing portion 21a.

The shaft 44 includes a cam 44c extending radially outwardly into an arc shape and arranged at an angular position opposite to the engagement position of the internal gear teeth 22a and the external gear teeth 24a. An outer diameter of the cam 44c is smaller than an inner diameter of the bearing ring 25, and at the same time greater than the outer diameter of the bearing portion 21a. Further, a portion of the cam 44c overlaps with each portion of the wedge pieces 26 and 27 extending from the axial end face of the bearing portion 21a in view of the axial position. The cam 44c is arranged between the wedge pieces 26 and 27 while forming a gap with each of the wedge pieces 26 and 27 in a circumferential direction.

The shaft 44 includes a shaft main portion 44d formed continuously from the flange 44b and extending towards the axial other side (i.e. left side in FIG. 4). The wedge pieces 26 and 27, and the spring 28 disposed between the bearing portion 21a and the bearing ring 25 are covered by a disc-shaped holder 46 provided at the shaft main portion 44d so as not to be dislocated. The holder 46 is prevented from moving towards the inner side by means of a ring 47 provided at the shaft main portion 44d on the inner side of the holder 46. That is, an axial position of the shaft 44 is fixed by the lower plate 21 and the holder 46 that are sandwiched between the rings 45 and 47.

The shaft 44 includes a serration shaft 44e formed continuously from the shaft main portion 44d and extending further to the axial other side (i.e. left side in FIG. 4). An outer shape of the serration shaft 44e is substantially similar as that of the serration shaft 29f. The shafts 29 and 44 are connected to each other so as to rotate as a unit by means of a cylindrical interlocking pipe 48 serration fitted to respective end portions of the serration shafts 29f and 44e. The shafts 29 and 44 are connected to each other in such a manner that the cams 29c and 44c are arranged in the same phase.

As shown in FIG. 4, an actuator 50 supported by the seat cushion frame 11 is connected to the shaft 29. The actuator 50 includes a worm 51 fixed to a rotation shaft of an electric motor (not shown), a worm wheel 52 engaging with the worm 51, a pinion 54 connected to an output shaft 53 of the worm wheel 52 so as to rotate as a unit therewith, and an output gear 55 serration fitted to the serration shaft 29d so as to rotate as a unit with the shaft 29 and engaging with the pinion 54. Accordingly, when the electric motor is driven to rotate, that rotation is transmitted to the shaft 29 via the worm 51, the worm wheel 52 (output shaft 53), the pinion 54, and the output gear 55. When the shaft 29 is rotated, the shaft 44 connected to the shaft 29 via the interlocking pipe 48 is rotated as a unit.

An operation of the present embodiment will be explained. In the normal operation in which the shaft 29 is stopped to rotate, both the wedge pieces 26 and 27 are biased by the spring 28 so as to separate from each other, i.e. biased in a direction where the amount of eccentricity between the internal gear teeth 22a and the external gear teeth 24a increases, the engagement position of the internal gear teeth 22a and the external gear teeth 24a of the reclining mechanism 20 is maintained. At this time, the engagement position of the internal gear teeth 32a and the external gear teeth 34a of the lower plate 31 and the upper plate 33 of the reclining mechanism 30, which are arranged in a mirror image relationship with the internal gear teeth 22a and the external gear teeth 24a of the lower plate 21 and the upper plate 23, is also maintained. Further, the engagement position of the internal gear teeth 22a and the external gear teeth 24a of the reclining mechanism 43 is maintained in a state where the shaft 44 is not rotated. Accordingly, the rotational angle of the seatback frames 12, 13, and 42 relative to the seat cushion frames 11 and 41 is maintained.

When the shaft 29 is driven to rotate by the actuator 50, one of the wedge pieces 26 and 27 of the reclining mechanism 20 is pressed by the cam 29c depending on a rotation direction of the shaft 29. The spring 28 is then biased and deformed, thereby causing the wedge portions 26 and 27 to rotate as a unit with the cam 29c. Thus, the engagement position of the internal gear teeth 22a and the external gear teeth 24a of the reclining mechanism 20 is shifted. At this time, the engagement position of the internal gear teeth 32a and the external gear teeth 34a of the lower plate 31 and the upper plate 33 of the reclining mechanism 30, which is arranged in a mirror image relationship with the internal gear teeth 22a and the external gear teeth 24a of the lower plate 21 and the upper plate 23, is also shifted. Further, the engagement position of the internal gear teeth 22a and the external gear teeth 24a of the reclining mechanism 43 is shifted as the shaft 44 is driven to rotate together with the shaft 29 in the aforementioned manner. Accordingly, the seatback frames 12, 13, and 42 are rotated relative to the seat cushion frames 11 and 41.

Meanwhile, when a weight of an occupant is applied in a vehicle forward direction in the event of a vehicle collision and then a large tensile load is added to the seat belt in the forward direction, i.e. precisely, a large load is added to the seatback frames 12 and 13, a large torque is generated in the seatback frames 12 and 13 on one side (i.e. left side in FIG. 4) of the seatback in the seat width direction where the shoulder anchor of the seat belt is attached. Then, when the internal gear teeth 22a or the external gear teeth 24a, the internal gear teeth 32a or the external gear teeth 34a, the wedge pieces 26 and 27, the bearing portions 21a and 31a, the bearing rings 25 and 35, and the like are deformed or the amount of eccentricity between the internal gear teeth 22a and the external gear teeth 24a decreases since the wedge pieces 26 and 27 are moved closer to each other against the biasing force of the spring 28, the amount of eccentricity d (see FIG. 3D) is achieved. Therefore, the inner peripheral surface and the outer peripheral surface of the support piece 36 make contact with the outer peripheral surface of the bearing portion 31a and the inner peripheral surface of the bearing ring 35, respectively, so that the reclining mechanism 30 can also receive the load or torque together with the reclining mechanism 20. As a result, strength can be improved against the large load on one side of the seat in the seat width direction where the reclining mechanisms 20 and 30 are provided.

As mentioned above, according to the present embodiment, the following effects can be obtained. That is, the engagement position of the internal gear teeth 22a and the external gear teeth 24a as well as that between the internal gear teeth 32a and the external gear teeth 34a is maintained by the pair of wedge pieces 26 and 27 biased by the spring 28 in a direction where the amount of eccentricity between the internal gear teeth 22a and the external gear teeth 24a increases. Thus, looseness due to a backlash between the internal gear teeth 22a and the external gear teeth 24a can be prevented, thereby improving a quality feeling.

In addition, the support member 36 makes contact or engages with the bearing portion 31a and the bearing ring 35 with the smaller amount of eccentricity, i.e. amount of eccentricity d, than the minimum amount of eccentricity c defined by the pair of wedge pieces 26 and 27. Therefore, the engagement position of the internal gear teeth 22a and the external gear teeth 24a as well as that between the internal gear teeth 32a and the external gear teeth 34a is not interfered by the support piece 36. That is, an increase of an operation force for rotating the cam 29c (i.e. shaft 29) can be avoided. For example, if a pair of reclining mechanisms 20 are connected to each other in a back-to-back manner, accuracy of the tooth profile and assembly are possible to vary between these two reclining mechanisms 20. The two reclining mechanisms 20 may not be precisely arranged in the mirror image manner. That is, the amounts of eccentricity of both the reclining mechanisms 20 are not exactly identical. Thus, even if the wedge piece 26 or 27 in one of the reclining mechanisms 20 is pressed by the cam, the wedge piece 26 or 27 in the other one of the reclining mechanisms 20 may not be pressed by the cam. If the wedge piece 26 or 27 in the other one of the reclining mechanisms 20 cannot be pressed by the cam, the operation force increases to thereby adversely affect the seat reclining operation. According to the present embodiment, such an adverse effect can be avoided.

Further, the identical parts are applied to the lower plates 21 and 31, and the upper plates 23 and 33. Thus, increase of the number of parts can be avoided. A cost increase such as a press die expense can be prevented.

Furthermore, if the large load is added to the seat in the event of the vehicle collision, the internal gear teeth 22a or the external gear teeth 24a, or the internal gear teeth 32a or the external gear teeth 34a are deformed, thereby causing the amount of eccentricity to decrease. At this time, when the amount of eccentricity between the internal gear teeth 32a and the external gear teeth 34a reaches the amount of eccentricity d, the inner peripheral surface and the outer peripheral surface of the support piece 36 make contact or engage with the outer peripheral surface of the bearing portion 31a and the inner peripheral surface of the bearing ring 35, respectively. The support piece 36 engages with the lower plate 31 and the upper plate 33 so as to receive the load, which can increase the strength of the seat reclining apparatus as a whole.

Furthermore, according to the aforementioned embodiment, the single cam 29c presses the pair of the wedge pieces 26 and 27, and the support piece 36, which can make the shape of the shaft 29 to be simplified as compared to a case where two cams are provided separately and individually to press the pair of wedge pieces 26 and 27, and the support piece 36.

Furthermore, according to the aforementioned embodiment, the strength against the torque of large load generated upon a vehicle collision can be improved in the belt integrated seat.

The present embodiment can be modified as follows. That is, grease can be applied to the gap formed, in the normal state, between the support piece 36 and the inner peripheral surface of the bearing ring 35 so as to prevent looseness.

The bearing rings 25 and 35 can be integrally formed with the upper plates 23 and 33 (precisely, the annular portions 24 and 34), respectively. In addition, the shaft 29 and the like can be operated manually by an operation handle connected to the shaft 29 so as to rotate as a unit therewith.

The internal gear teeth 22a and 32a can include two or more additional teeth compared to the external gear teeth 24a and 34a, respectively. In addition, a cam (first cam) to press the wedge pieces 26 and 27, and a cam (second cam) to press the support piece 36 can be individually formed at the shaft 29.

According to the aforementioned embodiment, the reclining mechanisms 20 and 30 are connected to each other through the connection between the upper plates 23 and 33. Alternatively, the lower plates 21 and 31 can be connected to each other through the connection between the reclining mechanisms 20 and 30. In this case, since the lower plates 21 and 31 open in axially opposite directions, the wedge pieces 26 and 27, and the support piece 36 are arranged away from each other in the axial direction. Thus, a cam (first cam) for pressing the wedge pieces 26 and 27, and a cam (second cam) for pressing the support piece 36 may be individually formed at the shaft 29.

In order that the wedge pieces 26 and 27, and the support piece 36 as a whole overlap with the cam 29c in view of the axial position, i.e. the whole end faces of the wedge pieces 26 and 27, and the support piece 36 can be pressed, the cam 29c can extend from the flange 29b forming an H-shape in cross section to thereby avoid an interference with the bearing portions 21a and 31a.

The seat reclining apparatus for a vehicle can include the reclining mechanisms 20 and 30 on both sides in the seat width direction. In this case, the strength against the large load generated upon a vehicle collision can be evenly improved between both sides in the seat width direction. Such a structure can be applied to a seat that tends to receive a large load entirely such as multiple seats where multiple occupants can be seated at the same time.

According to the aforementioned embodiment, the lower plates 21 and 31, and the upper plates 23 and 33 are supported by the seat cushion side and the seatback side, respectively. However, instead, the relationship thereof can be inversed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat reclining apparatus for a vehicle, comprising:
   a first plate attached to one of a seat cushion and a seatback and including internal gear teeth, the first plate provided at one side in a width direction of a seat;
   a second plate attached to the other one of the seat cushion and the seatback and including external gear teeth engaging with the internal gear teeth of the first plate, a total number of the external gear teeth being smaller than a total number of the internal gear teeth of the first plate, the second plate provided at the one side in the width direction of the seat;
   a third plate attached to the one of the seat cushion and the seatback and including internal gear teeth, the third plate provided at the one side in the width direction of the seat;
   a fourth plate attached to the other one of the seat cushion and the seatback and including external gear teeth engaging with the internal gear teeth of the third plate, a total number of the external gear teeth being smaller than a total number of the internal gear teeth of the third plate, the fourth plate provided at the one side in the width direction of the seat;
   a shaft rotatably supported by the first and third plates;
   first and second wedge members arranged between the first and second plates and biased in a direction where an amount of eccentricity between the internal gear teeth and the external gear teeth of the first and second plates is increased so as to maintain a position at which the internal gear teeth and the external gear teeth engage with each other;
   a first cam provided at the shaft and pressing the wedge members to integrally rotate therewith in response to a rotation of the shaft so that the position at which the internal gear teeth and the external gear teeth engage with each other is shifted in a circumferential direction;
   a support member arranged between the third and fourth plates and engaging with the third plate and the fourth plate when an amount of eccentricity between the internal gear teeth and the external gear teeth of the third and fourth plates reaches a predetermined level; and
   a second cam provided at the shaft and pressing the support member to integrally rotate therewith in response to a rotation of the shaft; wherein the amount of eccentricity defined by the support member is smaller than the amount of eccentricity defined by the wedge members.

2. A seat reclining apparatus for a vehicle according to claim 1, wherein the first and second cam are the same.

3. A seat reclining apparatus for a vehicle according to claim 1, wherein the wedge members are arranged between an outer peripheral surface of the shaft and an inner peripheral surface of an annular portion provided at the second plate, and are each getting wider in a radial direction towards an angular position in a circumferential direction where the internal gear teeth and the external gear teeth engage with each other.

4. A seat reclining apparatus for a vehicle according to claim 2, wherein the wedge members are arranged between an outer peripheral surface of the shaft and an inner peripheral surface of an annular portion provided at the second plate, and are each getting wider in a radial direction towards an angular position in a circumferential direction where the internal gear teeth and the external gear teeth engage with each other.

5. A seat reclining apparatus for a vehicle according to claim 3, wherein the wedge members are biased by a spring in a direction where the wedge members are separated from each other in a circumferential direction so as to increase the amount of eccentricity between the internal gear teeth and the external gear teeth.

6. A seat reclining apparatus for a vehicle according to claim 4, wherein the wedge members are biased by a spring in a direction where the wedge members are separated from each other in a circumferential direction so as to increase the amount of eccentricity between the internal gear teeth and the external gear teeth.

7. A seat reclining apparatus for a vehicle according to claim 5, wherein the spring includes an Ω shape and one end and the other end of which engage with the wedge members, respectively.

8. A seat reclining apparatus for a vehicle according to claim 6, wherein the spring includes an Ω shape and one end and the other end of which engage with the wedge, respectively.

9. A seat reclining apparatus for a vehicle according to claim 5, wherein the wedge members increase the amount of eccentricity between the internal gear teeth and the external gear teeth by separating from each other and decrease the amount of eccentricity between the internal gear teeth and the external gear teeth by approaching each other, and the support member makes contact with the outer peripheral surface of the shaft and an inner peripheral surface of an annular portion provided at the fourth plate when the amount of eccentricity defined by the support member reaches the predetermined level.

10. A seat reclining apparatus for a vehicle according to claim 6, wherein the wedge members increase the amount of eccentricity between the internal gear teeth and the external gear teeth by separating from each other and decrease the amount of eccentricity between the internal gear teeth and the external gear teeth by approaching each other, and the support member makes contact with the outer peripheral surface of the shaft and an inner peripheral surface of an annular portion provided at the fourth plate when the amount of eccentricity defined by the support member reaches the predetermined level.

11. A seat reclining apparatus for a vehicle according to claim 7, wherein the wedge members increase the amount of eccentricity between the internal gear teeth and the external gear teeth by separating from each other and decrease the amount of eccentricity between the internal gear teeth and the external gear teeth by approaching each other, and the support member makes contact with the outer peripheral surface of the shaft and an inner peripheral surface of an annular portion provided at the fourth plate when the amount of eccentricity defined by the support member reaches the predetermined level.

12. A seat reclining apparatus for a vehicle according to claim 8, wherein the wedge members increase the amount of eccentricity between the internal gear teeth and the external gear teeth by separating from each other and decrease the amount of eccentricity between the internal gear teeth and the external gear teeth by approaching each other, and the support member makes contact with the outer peripheral surface of the shaft and an inner peripheral surface of an annular portion provided at the fourth plate when the amount of eccentricity defined by the support member reaches the predetermined level.

13. A seat reclining apparatus for a vehicle according to claim 3, further comprising: a bearing ring press fitted to the inner peripheral surface of the annular portion provided at the second plate, and the wedge members are arranged between an inner peripheral surface of the bearing ring and the outer peripheral surface of the shaft.

14. A seat reclining apparatus for a vehicle according to claim 5, further comprising: a bearing ring press fitted to the inner peripheral surface of the annular portion provided at the second plate, and the wedge members are arranged between an inner peripheral surface of the bearing ring and the outer peripheral surface of the shaft.

15. A seat reclining apparatus for a vehicle according to claim 7, further comprising: a bearing ring press fitted to the inner peripheral surface of the annular portion provided at the second plate, and the wedge members are arranged between an inner peripheral surface of the bearing ring and the outer peripheral surface of the shaft.

16. A seat reclining apparatus for a vehicle according to claim 11, further comprising: a bearing ring press fitted to the inner peripheral surface of the annular portion provided at the second plate, and the wedge members are arranged between an inner peripheral surface of the bearing ring and the outer peripheral surface of the shaft.

* * * * *